(12) United States Patent
Ota et al.

(10) Patent No.: US 10,374,226 B2
(45) Date of Patent: Aug. 6, 2019

(54) COATED LITHIUM-NICKEL COMPOSITE OXIDE PARTICLES, AND METHOD FOR PRODUCING COATED LITHIUM-NICKEL COMPOSITE OXIDE PARTICLES

(71) Applicant: SUMITOMO METAL MINING CO., LTD., Tokyo (JP)

(72) Inventors: Yosuke Ota, Chiba (JP); Hidetoshi Yamabe, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 210 days.

(21) Appl. No.: 15/314,729

(22) PCT Filed: May 20, 2015

(86) PCT No.: PCT/JP2015/064474
§ 371 (c)(1),
(2) Date: Nov. 29, 2016

(87) PCT Pub. No.: WO2015/182452
PCT Pub. Date: Dec. 3, 2015

(65) Prior Publication Data
US 2017/0200942 A1    Jul. 13, 2017

(30) Foreign Application Priority Data
May 30, 2014   (JP) .................................. 2014-112650

(51) Int. Cl.
*H01M 4/36* (2006.01)
*C01G 53/00* (2006.01)
(Continued)

(52) U.S. Cl.
CPC ............ *H01M 4/366* (2013.01); *B01J 13/04* (2013.01); *C01G 53/00* (2013.01); *C01G 53/42* (2013.01);
(Continued)

(58) Field of Classification Search
None
See application file for complete search history.

(56) References Cited

U.S. PATENT DOCUMENTS 3,920,865 A    11/1975  Läufer
2009/0194747 A1   8/2009  Zou
(Continued)

FOREIGN PATENT DOCUMENTS

JP    2007-165297 A1    6/2007
JP    2011-511402 A1    4/2011
(Continued)

OTHER PUBLICATIONS

Britcher L G et al: "Siloxane Coupling Agents", Macromolecules, American Chemical Society, US, vol. 28, No. 9, Apr. 24, 1995, pp. 3110-3118, XP000500417 (Sheets 9).
(Continued)

*Primary Examiner* — Alexandre F Ferre
(74) *Attorney, Agent, or Firm* — Kratz, Quintos & Hanson, LLP

(57) ABSTRACT

Provided are: superior coated lithium-nickel composite oxide particles which have an environmental stability that enables suppression of the occurrence of impurities due to absorption of moisture or carbon dioxide, which have high adhesion that prevents a coating layer from readily separating, and which have lithium ion conductivity; and a method for producing such particles. Provided is a method for producing coated lithium-nickel composite oxide particles, the method being characterized by contacting a cyclic siloxane with the surfaces of nickel-based lithium-nickel composite oxide particles to form surface coats. The particles have high adhesion to a coating layer and as a compound can suppress the permeation of moisture and carbon dioxide, and also have lithium ion conductivity. It is therefore possible to
(Continued)

provide coated lithium-nickel composite oxide particles that are excellent for use in lithium ion cells.

12 Claims, 5 Drawing Sheets

(51) Int. Cl.
| | |
|---|---|
| H01M 10/0525 | (2010.01) |
| H01M 4/525 | (2010.01) |
| H01M 4/131 | (2010.01) |
| H01M 4/1391 | (2010.01) |
| B01J 13/04 | (2006.01) |
| H01M 4/04 | (2006.01) |
| H01M 4/505 | (2010.01) |

(52) U.S. Cl.
CPC ......... *H01M 4/0421* (2013.01); *H01M 4/131* (2013.01); *H01M 4/1391* (2013.01); *H01M 4/36* (2013.01); *H01M 4/505* (2013.01); *H01M 4/525* (2013.01); *H01M 10/0525* (2013.01); *C01P 2006/40* (2013.01)

(56) References Cited

U.S. PATENT DOCUMENTS

| | | |
|---|---|---|
| 2010/0015514 A1 | 1/2010 | Migagi |
| 2012/0196183 A1 | 8/2012 | Chiga |
| 2012/0261610 A1 | 10/2012 | Paulsen |
| 2014/0087252 A1 | 3/2014 | Hirakawa |
| 2014/0287327 A1 | 9/2014 | Lee |
| 2015/0221983 A1 | 8/2015 | Kamiya |
| 2016/0301063 A1 | 10/2016 | Yukinobu |

FOREIGN PATENT DOCUMENTS

| | | |
|---|---|---|
| JP | 2012-169249 A1 | 9/2012 |
| JP | 2013-179063 A1 | 9/2013 |
| JP | 2014-53097 A1 | 3/2014 |
| WO | 2012/153469 A1 | 11/2012 |
| WO | 2013/133572 A1 | 9/2013 |
| WO | WO 2013/133572 * | 9/2013 |

OTHER PUBLICATIONS

Minki Jo et al: "A New High Power LiNi0.81 Co0.1 Al0.09 O2 Cathode Material for Lithium-Ion Batteries", Advanced Energy Materials, vol. 4, No. 13, Apr. 25, 2014, p. 1301583, XP055426418 (Sheets 8).

Yoshiki Chujo et al: "Synthesis of polysiloxane graft copolymers by hydrosilylation reactions", Makromol. Chem., vol. 186, No. 6, Jun. 1, 1985, pp. 1203-1211, XP055426267 (Sheets 9).

Extended European Search Report issued to EP Patent Application No. 15799078.9, dated Mar. 1, 2018 (Sheets 11).

International Search Report for International Application No. PCT/JP2015/064474 dated Aug. 25, 2015.

Office Action issued to CN Patent Application No. 201580028053.7, dated Jun. 12, 2018 (6 sheets).

Yo Yo, et al.; "Full-Text Database of Articles by Chinese Excellent Graduate School Students, Step Scientific Technique 1"; Production and Functional Studies of Iron Lithium Phosphate Cathode Materials Coated with Polypyrrole, 11th term; dated Dec. 15, 2009; (45 sheets, 1 sheet translation of pertinent section of Office Action issued to CN Patent Application No. 201580028053.7 dated Jun. 12, 2018; 5 sheets total).

* cited by examiner

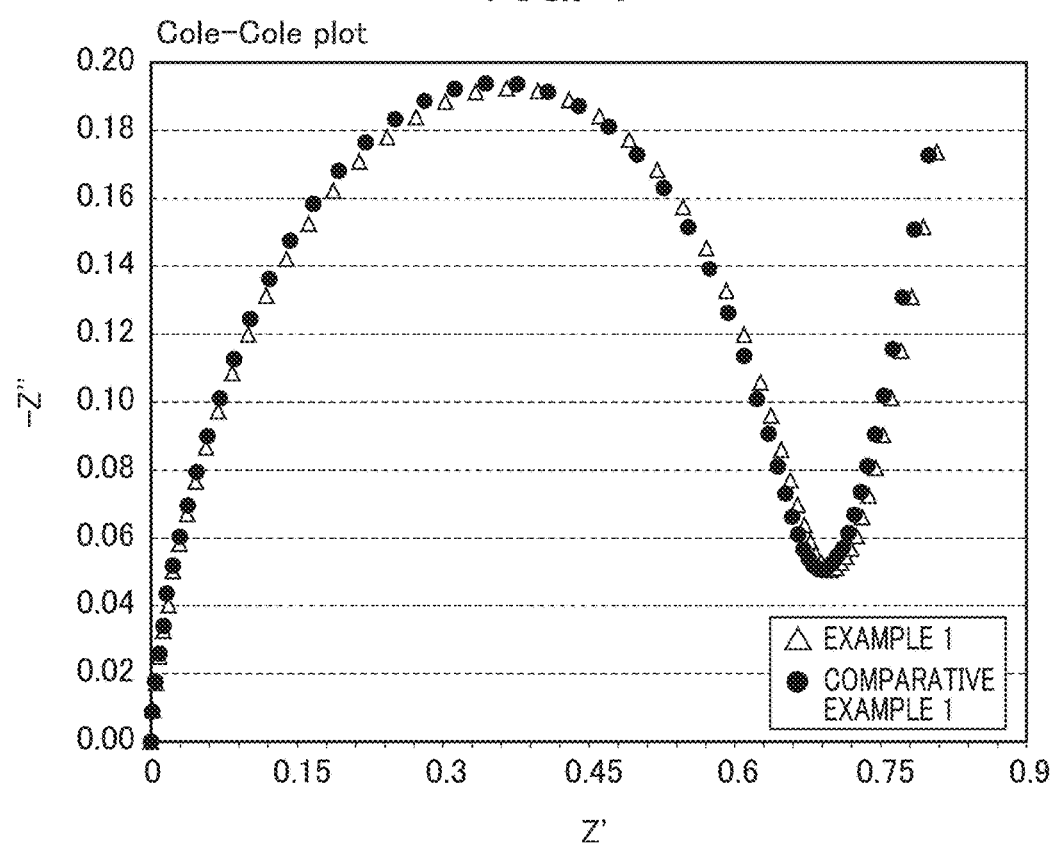

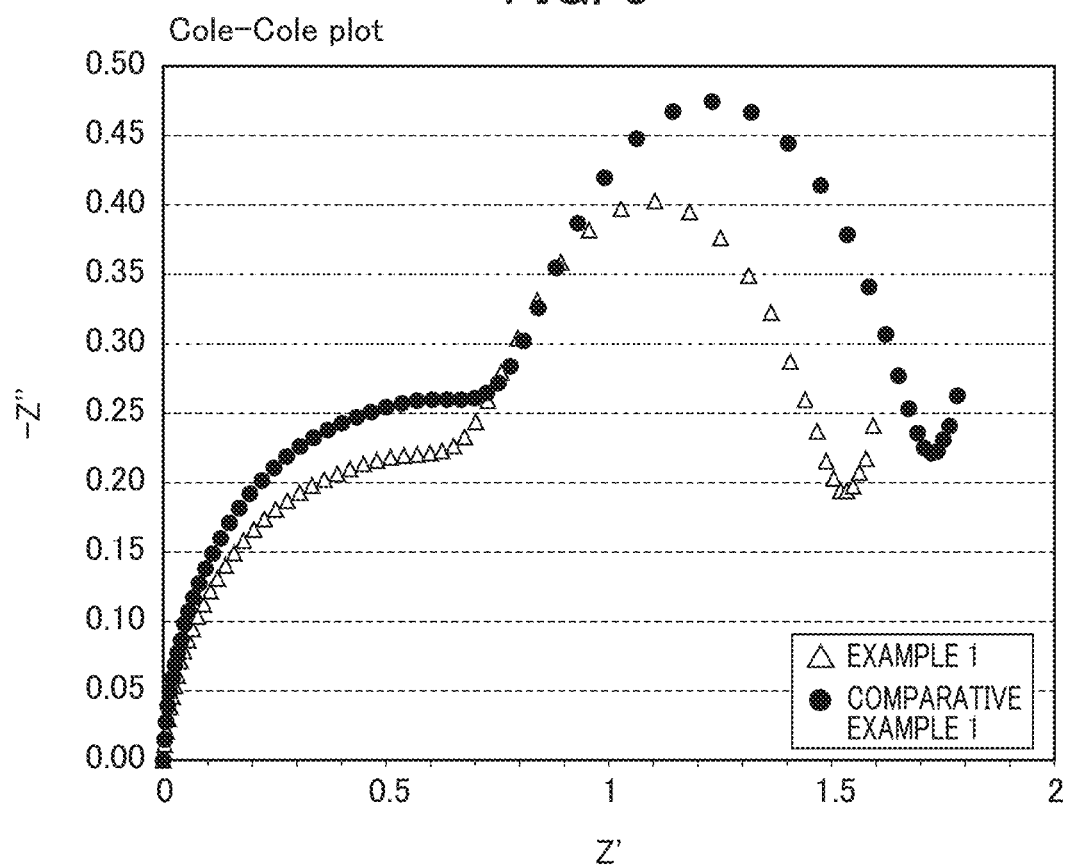

COATED LITHIUM-NICKEL COMPOSITE OXIDE PARTICLES, AND METHOD FOR PRODUCING COATED LITHIUM-NICKEL COMPOSITE OXIDE PARTICLES

TECHNICAL FIELD

The present invention relates to coated lithium-nickel composite oxide particles with a high content of nickel, and also relates to coated lithium-nickel composite oxide particles of which the stability under the atmosphere is improved and which is easy to handle, and a method for producing the coated lithium-nickel composite oxide particles.

BACKGROUND ART

In recent years, along with the rapid expansion of small sized electronic devices such as cellular phones and laptop computers, a demand for a lithium-ion secondary battery as a chargeable and dischargeable power source has been rapidly increased. A lithium-cobalt oxide (hereinafter, sometimes also referred to as cobalt-based) has been widely used as a positive-electrode active substance contributing to the charging and discharging in a positive electrode of a lithium-ion secondary battery. However, capacity of the cobalt-based positive electrode has improved to the extent of theoretical capacity through the optimization of battery design, and higher raparity is becoming difficult to achieve.

Accordingly, lithium-nickel composite oxide particles using a lithium-nickel oxide that have the theoretical capacity higher than that of the conventional cobalt-based one has been developed. However, the pure lithium-nickel oxide has a problem in terms of safety, cycle characteristics, and the like because of the high reactivity with water, carbon dioxide, or the like, and is difficult to be used as a practical battery. Therefore, lithium-nickel composite oxide particles to which a transition metal element such as cobalt, manganese, and iron, or aluminum has been developed as an improvement measure for the problem described above.

In the lithium-nickel composite oxide, there are composite oxide particles expressed by a transition metal composition of $Ni_{0.33}Co_{0.33}Mn_{0.33}$, a so-called ternary composite oxide (hereinafter, sometimes referred to as ternary), which is made by adding nickel, manganese, and cobalt in an equimolar amount, respectively, and lithium-nickel composite oxide particles with a nickel content exceeding 0.65 mol, a so-called nickel-based composite oxide (hereinafter, sometimes referred to as nickel-based). From the viewpoint of capacity, a nickel-based with a large nickel content has a great advantage as compared to a ternary.

However, the nickel-based is characterized by being more sensitive depending on the environment as compared to a cobalt-based or a ternary, because of the high reactivity with water, carbon dioxide, and the like, and absorbing moisture and carbon dioxide ($CO_2$) in the air more easily. It has been reported that the moisture and carbon dioxide are deposited on particle surfaces as impurities such as lithium hydroxide (LiOH), and lithium carbonate ($Li_2CO_3$), respectively, and have an adverse effect on the production process of a positive electrode or battery performance.

By the way, the production process of a positive electrode passes through a process in which a positive electrode mixture slurry obtained by mixing lithium-nickel composite oxide particles, a conductive auxiliary, a binder, an organic solvent, and the like is applied onto a collector made of aluminum or the like, and dried. In general, in the production process of a positive electrode mixture slurry, lithium hydroxide causes the slurry viscosity to increase rapidly by reacting with a binder, and may cause gelation of the slurry. These phenomena cause faults and defects, and a decrease of production yield of a positive electrode, and may cause a variation in quality of the products. Further, during charging and discharging, these impurities react with an electrolytic solution and sometimes generate gas, and may cause a problem in the stability of the battery.

Accordingly, in a case where a nickel-based is used as a positive-electrode active substance, in order to prevent the generation of impurities such as the above-described lithium hydroxide (LiOH), the production process of a positive electrode is required to be performed in a dry (low humidity) environment in a decarbonated atmosphere. Therefore, there is a problem that in spite of having high theoretical capacity and showing great promise as a material of a lithium-ion secondary battery, the nickel-based requires high cost for the introduction of a facility and high running costs for the facility in order to maintain the production environment, and which becomes a barrier to it becoming widespread.

In order to solve the problem described above, a method of coating surfaces of lithium-nickel composite oxide particles by using a coating agent has been proposed. Such a coating agent is roughly classified as an inorganic coating agent and an organic coating agent. As the inorganic coating agent, a material such as titanium oxide, aluminum oxide, aluminum phosphate, cobalt phosphate, fumed silica, and lithium fluoride have been proposed, and as the organic coating agent, a material such as carboxymethyl cellulose, and a fluorine-containing polymer have been proposed.

For example, in Patent Document 1, a method of forming a lithium fluoride (LiF) or fluorine-containing polymer layer on surfaces of lithium-nickel composite oxide particles has been proposed, and in Patent Document 2, a method of forming a fluorine-containing polymer layer onto lithium-nickel composite oxide particles, and further adding a Lewis acid compound to neutralize impurities has been proposed. In any processing, the surfaces of lithium-nickel composite oxide particles are modified so as to have the hydrophobic property with a coated layer containing a fluorine-based material, and the adsorption of moisture is suppressed, and the deposition of impurities such as lithium hydroxide (LiOH) can be suppressed.

However, the coated layer containing the above-described fluorine-based material, which is used in these coating methods, is merely attached onto lithium-nickel composite oxide particles only by electrostatic attraction. Accordingly, the coated layer is redissolved in N-methyl-2-pyrrolidone (NMP), which is used as a solvent in the slurry production process, therefore, the coated layer is easily detached from the lithium-nickel composite oxide particles. As a result, the positive electrode is required to be stored in a dry (low humidity) environment in a decarbonated atmosphere, and not only cannot the faults and defects and the decrease of production yield, which are problems in the nickel-based, be suppressed, but also the problem with the stability of a battery substantially due to the generation of impurities cannot be thoroughly solved.

Patent Document 1: Japanese Unexamined Patent Application, Publication No. 2013-179063

Patent Document 2: Japanese Unexamined Patent Application (Translation of PCT Application), Publication No. 2011-511402

DISCLOSURE OF THE INVENTION

Problems to be Solved by the Invention

In view of the above-described problems of conventional technique, an object of the present invention is to provide coated lithium-nickel composite oxide particles that can be handled under the atmosphere and can obtain coated films of lithium-nickel composite oxide particles, the films not having an adverse effect on the battery characteristics, and a method for producing the coated lithium-nickel composite oxide particles.

Means for Solving the Problems

As a result of intensive studies to solve the above-described problems of conventional technique, the present inventors have found that coated lithium-nickel composite oxide particles on which surface coats have been formed by bringing a cyclic siloxane into contact with surfaces of nickel-based lithium-nickel composite oxide particles has strong adhesion to the coated layer, and the compound can suppress the permeation of moisture and carbon dioxide and have lithium ion conductivity. Further, as to the coated lithium-nickel composite oxide particles, the coated layer does not peel off from the particle surfaces even when a positive electrode mixture slurry is kneaded. Accordingly, the present inventors have found excellent coated lithium-nickel composite oxide particles that can stably suppress the adsorption of moisture and carbon dioxide without detaching the coated layer even under an ordinary environment, not in the dry (low humidity) environment in a decarbonated atmosphere, and a method for producing the coated lithium-nickel composite oxide particles; and thus have completed the present invention.

Specifically, the present invention provides the following.

That is, a first aspect of the present invention is a method for producing a coated lithium-nickel composite oxide particles, including forming surface coats by bringing a cyclic siloxane into contact with surfaces of nickel-based lithium-nickel composite oxide particles.

A second aspect of the present invention is the method for producing coated lithium-nickel composite oxide particles according to the first aspect of the invention, in which the cyclic siloxane is 2,4,6,8-tetramethylcyclotetrasiloxane of the following Formula (1), and forms surface coats by gas-phase contact.

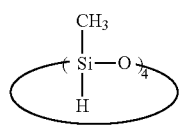

(1)

A third aspect of the present invention is the method for producing coated lithium-nickel composite oxide particles according to the second aspect of the invention, in which an environmental temperature at the time of the gas-phase contact is from 40° C. to 100° C.

A fourth aspect of the present invention is the method for producing coated lithium-nickel composite oxide particles according to the second or third aspect of the invention, in which an organic ether compound or organic ester compound having an unsaturated bond at one end is added to a residual hydrogen atom after the gas-phase contact.

A fifth aspect of the present invention is the method for producing coated lithium-nickel composite oxide particles according to any one of the first to fourth aspects of the invention, in which the lithium-nickel composite oxide is represented by the following Formula (2), $$Li_xNi_{(1-y-z)}M_yN_zO_2 \quad (2)$$

(in the formula, x is a value of from 0.80 to 1.10, y is a value of from 0.01 to 0.20, z is a value of from 0.01 to 0.15, and 1−y−z is a value exceeding 0.65, and M represents at least one element selected from Co or Mn, and N represents at least one element selected from Al, In or Sn.)

A sixth aspect of the present invention is coated lithium-nickel composite oxide particles, in which the coated lithium-nickel composite oxide particles are obtained by the method for producing coated lithium-nickel composite oxide particles according to any one of the first to fifth aspects of the invention, and the surface coats are represented by the following Formula (3), $$(R_1R_2SiO)_a[(R_1)(R_2)_2SiO_{1/2}]_b(R_1SiO_{3/2})_c \quad (3)$$

(in the formula, $R_1$ represents a methyl group, and $R_2$ represents a functional group including one or more selected from the group consisting of at least an ether group and a hydrogen group, and a, b, and c represent a positive integer including zero.)

A seventh aspect of the present invention is the coated lithium-nickel composite oxide particles according to the sixth aspect of the invention, in which the $R_2$ in the above Formula (3) is an ether group of the following Formula (4), $$-C_nH_{2n}-O-C_mH_{2m+1} \quad (4)$$

(in the formula, n and m represent an integer of from 2 to 10, respectively.)

An eighth aspect of the present invention is the coated lithium-nickel composite oxide particles according to the sixth or seventh aspect of the invention, in which mass of the surface coats are from 0.1 to 1.0% by mass based on the lithium-nickel composite oxide particles.

A ninth aspect of the present invention is the coated lithium-nickel composite oxide particles according to any one of the sixth to eighth aspects of the invention, in which the coated lithium-nickel composite oxide particles are used as a positive-electrode active substance of a lithium-ion battery.

A tenth aspect of the present invention is the coated lithium-nickel composite oxide particles according to any one of the sixth to ninth aspects of the invention, in which the coated lithium-nickel composite oxide particles are spherical particles having an average particle diameter of from 5 to 20 μm.

Effects of the Invention

According to the present invention, coated lithium-nickel composite oxide particles produced by bringing a cyclic siloxane into contact with surfaces of nickel-based lithium-nickel composite oxide particles can suppress the generation of impurities by the absorption of moisture and carbon dioxide due to the high environmental stability, has high adhesion so that the coated layer is not easily detached, has lithium ion conductivity, and is excellent coated lithium-nickel composite oxide particles; and a method for producing the coated lithium-nickel composite oxide particles are provided.

The coated lithium-nickel composite oxide particles can be provided as a high capacity composite oxide positive-electrode active substance for a lithium-ion battery, for which production equipment that has been used for a cobalt-based (LCO) and ternary (NCM) can also be used instead of positive-electrode production equipment in which carbon dioxide concentration and moisture concentration are strictly controlled.

BRIEF DESCRIPTION OF THE DRAWINGS

FIG. 4 shows a Cole-Cole plot from an impedance test before the cycle test.

FIG. 5 shows a Cole-Cole plot from an impedance test after the cycle test of 500 cycles.

PREFERRED MODE FOR CARRYING OUT THE INVENTION

Figure 1:
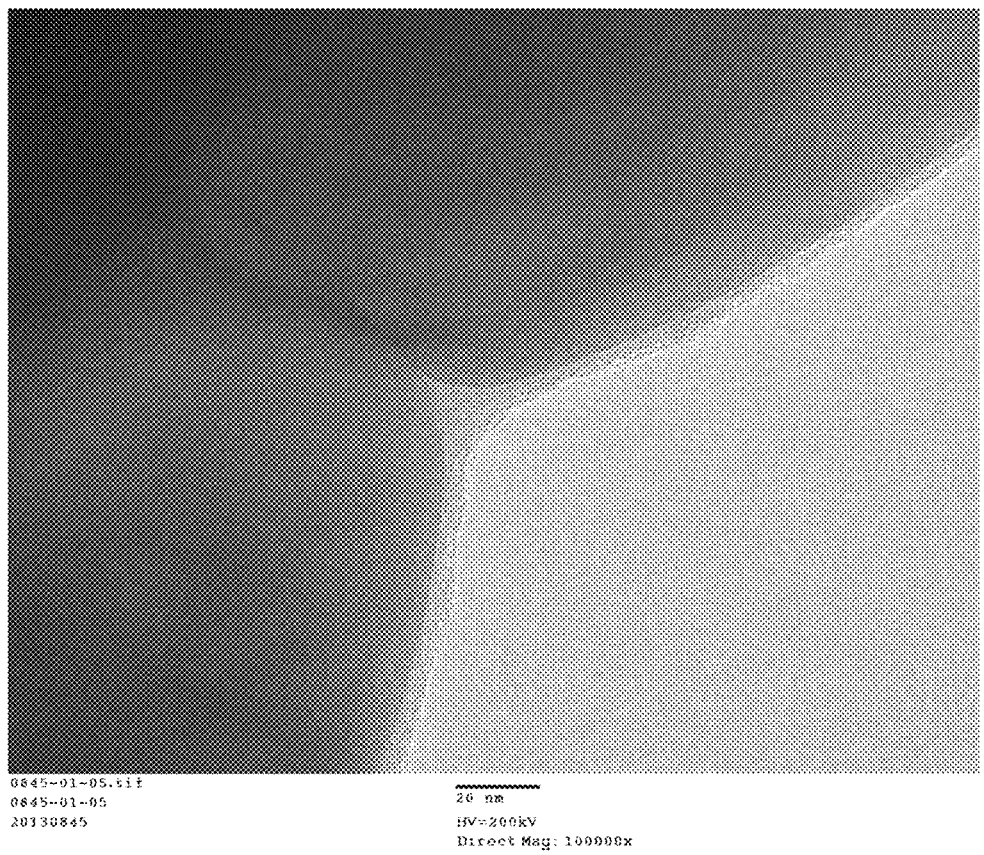
FIG. 1 is a transmission electron microscopic (TEM) picture showing lithium-nickel composite oxide particles, the surfaces of which are coated with a compound represented by Formula (3) in Example 1.

Hereinafter, coated lithium-nickel composite oxide particles and a method for producing the same, according to the present invention, will be described in detail. However, the present invention should not be construed as being limited to the following detailed explanation. In the present invention, there may be a case where a secondary particle aggregated with primary particles is referred to as lithium-nickel composite oxide particles.

[Compound Coating Surfaces of Nickel-Based Lithium-Nickel Composite Oxide Particles]

A compound coating surfaces of nickel-based lithium-nickel composite oxide particles has a structure of the following Formula (3), and has a network structure constituted three-dimensionally.

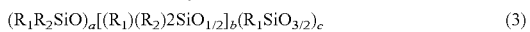

$(R_1R_2SiO)_a[(R_1)(R_2)2SiO_{1/2}]_b(R_1SiO_{3/2})_c$ (3)

In Formula (3), $R_1$ represents a methyl group, and $R_2$ represents a hydrocarbon containing an ether bond (hereinafter, sometimes referred to as an ether group) or a hydrogen atom. a, b, and c represent a positive integer including zero. Among them, $R_2$ is preferably an ether group represented by the following Formula (4). By introducing a hydrocarbon into which an ether structure has been introduced into $R_2$, the lithium ion conductivity is further improved.

—$C_nH_{2n}$—O—$C_mH_{2m+1}$ (4)

(in the formula, n, and m represent an integer of from 2 to 10, respectively)

Examples of the compound to coat include a cyclic siloxane, and from the viewpoint of the easiness of the production described later, the compound is particularly preferably 2,4,6,8-tetramethylcyclotetrasiloxane represented by the following Formula (1)

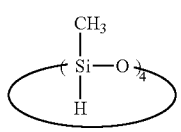

(1)

As to the compound, the ring-opening reaction and polymerization reaction proceed at a highly reactive point, called an active point on surfaces of nickel-based lithium-nickel composite oxide particles, and the compound becomes coated films having a three-dimensional structure. At the same time, the compound is reacted with a hydroxyl group on surfaces of lithium-nickel composite oxide particles. Therefore, coated lithium-nickel composite oxide particles that have adhesion stronger than that in a case of simply adhering only by electrostatic attraction, hardly detaches the compound in a slurry production process or the like, and has higher environmental stability can be obtained. As a result, coated lithium-nickel composite oxide particles having extremely high environmental stability can be obtained because the compound does not fall off due to a solvent or the like.

In addition, the coating amount of a compound of Formula (3) is preferably from 0.1 to 1.0% by mass, and more preferably from 0.2 to 0.5% by mass based on 100% by mass of the nickel-based lithium-nickel composite oxide particles. When the coating amount is less than 0.1% by mass, the processing tends to be insufficient, and when the coating amount exceeds 1.0% by mass, aggregation of particles tends to be easily generated.

[Nickel-Based Lithium-Nickel Composite Oxide Particles]

The nickel-based lithium-nickel composite oxide particles are spherical particles, and have the average particle diameter preferably of from 5 to 20 μm. When the average particle diameter is set in the range, favorable battery performance is provided as the lithium-nickel composite oxide particles, and further favorable battery repetition life (cycle characteristics) is also provided, both can be achieved, therefore, this is preferred.

In addition, the nickel-based lithium-nickel composite oxide particles are preferably represented by the following Formula (2).

$Li_xNi_{(1-y-z)}M_yN_zO_2$ (2)

in the formula, x is a value of from 0.80 to 1.10, y is a value of from 0.01 to 0.20, z is a value of from 0.01 to 0.15, and 1−y−z is a value exceeding 0.65, and M represents at least one element selected from Co or bin, and N represents at least one element selected from Al, In or Sn.

Further, the value of 1−y−z (nickel content) is, from the viewpoint of the capacity, preferably a value exceeding 0.70, and more preferably a value exceeding 0.80.

The cobalt-based (LCO), the ternary (NCM), and the nickel-based (NCA) have an electrode energy density (Wh/L) of 2160 Wh/L ($LiCoO_2$), 2018.6 Wh/L ($LiNi_{0.33}Co_{0.33}Mn_{0.33}Co_{0.33}O_2$), and 2376 Wh/L ($LiNi_{0.8}Co_{0.15}Al_{0.05}O_2$), respectively. Accordingly, by using the nickel-based lithium-nickel composite oxide particles as a positive-electrode active substance of a lithium-ion battery, a battery having high capacity can be prepared.

[Method for Producing Coated Lithium-Nickel Composite Oxide Particles]

As a method for producing coated lithium-nickel composite oxide particles, that is, a method for coating nickel-based lithium-nickel composite oxide particles with a compound of Formula (3), various methods can be used as long as they are methods for forming surface coats by contact, and are not particularly limited. For example, nickel-based lithium-nickel composite oxide particles are dispersed in a solution of organodichlorosilane, and coat films are formed on surfaces of nickel-based lithium-nickel composite oxide particles by a crosslinking reaction, as a result of which the coated lithium-nickel composite oxide particles according to the present invention can be produced. At this time, the reaction rate can also be controlled by adding calcium carbonate.

Specifically, the coated lithium-nickel composite oxide particles can be produced by dispersing nickel-based lithium-nickel composite oxide particles in a solution of a siloxane compound, and then by drying the resultant product, and can also be produced by spraying a siloxane compound dissolved in a solvent onto the lithium-nickel composite oxide particles, and by heating and drying the resultant product.

In addition, for example, by mixing a lithium nickel composite oxide, and a cyclic siloxane compound such as 2,4,6,8-tetramethylcyclotetrasiloxane, which is represented by Formula (1), in a ball mill, the coated lithium-nickel composite oxide particles according to the present invention can also be produced.

As described above, by using the various processing methods, the coated lithium-nickel composite oxide particles used for the present invention can be produced, and in particular, a method of using a catalytic activity existing on surfaces of the lithium-nickel composite oxide particles is particularly preferred because of being simple and easy, and being capable of performing the coating efficiently.

That is, by placing a cyclic siloxane represented by Formula (1) and a lithium-nickel composite oxide separately in containers, and leaving them in a closed system under a gas phase, or by arranging a volatile tank, and introducing a cyclic siloxane placed in an apparatus outside, coated lithium-nickel composite oxide particles coated naturally without adding any physical forces can be obtained. That is, the volatilized cyclic siloxane reaches the lithium-nickel composite oxide particles, and is adsorbed onto surfaces of the lithium-nickel composite oxide particles in a molecular state. The vapor pressure of the cyclic siloxane in a closed system is lowered by the adsorption, and therefore, the cyclic siloxane is newly volatilized again and again.

Inside the closed system, the entire containers are heated to from 40 to 100° C. under reduced pressure or under normal pressure, and heat treatment is preferably performed from over 1 to 24 hours. That is, in forming coat films, by volatilizing a cyclic siloxane compound placed in another container, and bringing the volatilized cyclic siloxane compound into contact with the lithium-nickel composite oxide particles in a gas phase, coat films are adequately formed onto the entire surfaces of the lithium-nickel composite oxide particles (forming of coat films by a gas phase method).

As for the temperature condition when forming coat films, the present production method uses a catalytic activity existing on surfaces of the lithium-nickel composite oxide particles, therefore, is not particularly required to be performed in a high temperature environment, but when the temperature of the entire vacuum container is less than 40° C., the cyclic siloxane compound is not sufficiently volatilized, and there may be a case when coating the entire surfaces of the lithium-nickel composite oxide particles becomes difficult. On the other hand, when the temperature is higher than 100° C., there is a risk that deterioration of the cyclic siloxane compound or the lithium-nickel composite oxide particles is caused. Therefore, as for the temperature condition, as described above, the coating is preferably performed in an atmosphere of the entire vacuum container of from 40 to 100° C.

Further, as to the processing time, when the processing time is extremely short, the coat films are not sufficiently formed, on the other hand, even when the processing time is set to be long, the coating is not performed over a certain coating amount. From this, the processing time is, as described above, from 1 to 24 hours, and more preferably from 6 to 12 hours.

By setting the above-described temperature condition and processing time condition as the forming conditions of coat films based on a gas phase method, an operation in which the lithium-nickel composite oxide particles and a cyclic siloxane compound having volatility are arranged in a container can be carried out. With such a simple operation, the volatilized cyclic siloxane compound is brought into contact with surfaces of the lithium-nickel composite oxide particles, and the coat films can be efficiently formed on the entire surfaces and over the details of the lithium-nickel composite oxide particles. Further, in order to coat the entire surfaces of the lithium-nickel composite oxide particles with a cyclic siloxane compound more efficiently and more reliably, a mixing device such as a stirrer is preferably installed inside the vacuum container.

The cyclic siloxane compound adsorbed in this way onto surfaces of the lithium-nickel composite oxide particles is made to be a silicon compound having a network structure by ring-opening polymerization, and is crosslinked with and coats surfaces of the lithium-nickel composite oxide particles. Therefore, the coat adheres more strongly different from that in a case of being coated only by electrostatic attraction, and excellent coated lithium-nickel composite oxide particles having high environmental stability can be produced.

[Hydrosilylation Reaction]

Many Si—H groups exist in a cyclic siloxane compound such as 2,4,6,8-tetramethylcyclotetrasiloxane, which is represented by Formula (1). Accordingly, the positive electrode mixture slurry prepared by using the coated lithium-nickel composite oxide particles to which only the coating processing has been performed has a possibility of generating hydrogen gas and being swollen. Therefore, an aliphatic unsaturated hydrocarbon such as alkene, and alkyne is added to the residual Si—H groups, and replacing for Si—H bonds, that is, hydrosilylation is preferably performed. Through the hydrosilylation, the number of Si—H groups of a siloxane compound in a coated layer is reduced, and the generation of hydrogen caused by the Si—H groups in a formed positive electrode mixture slurry can be prevented.

The aliphatic unsaturated hydrocarbon to be added to the siloxane compound is an aliphatic unsaturated hydrocarbon having at least one unsaturated bond (double bond, or triple bond) at an arbitrary position, preferably at the end. By having an unsaturated bond (double bond, or triple bond) at the end, the hydrosilylation reaction proceeds rapidly, and this is preferred. Further, by using an aliphatic unsaturated hydrocarbon into which an ether structure has been introduced, the conductivity of lithium ion is further improved, and therefore, this is preferred. Furthermore, the ether bond relating to the above-described ether group has a concept including a bond represented by —C—O—C—, for example, an ester bond, and the like in addition to the one represented by Formula (4).

Examples of the aliphatic unsaturated hydrocarbon include, for example, vinyl alkyl ether such as 1-(vinyloxy)methane, 1-(vinyloxy)ethane, 1-(vinyloxy)propane, 1-(vinyloxy)butane, 1-(vinyloxy)pentane, 1-(vinyloxy)hexane, 1-(vinyloxy)heptane, 1-(vinyloxy)octane, 1-(vinyloxy)nonane, and 1-(vinyloxy)decane; allyl alkyl ether such as 1-(2-propenyloxy)methane, 1-(2-propenyloxy)ethane, 1-(2-propenyloxy)propane, 1-(2-propenyloxy)butane, 1-(2-propenyloxy)pentane, 1-(2-propenyloxy)hexane, 1-(2-propenyloxy)heptane, 1-(2-propenyloxy)octane, 1-(2-propenyloxy)nonane, and 1-(2-propenyloxy)decane; and a derivative containing one or more double bonds in the above-described alkyl group.

As long as having an unsaturated bond at one end of an ether bond, the aliphatic unsaturated hydrocarbon can be added to a Si—H group at one end of an ether bond. By adding the aliphatic unsaturated hydrocarbon to a Si—H group at one end of an ether bond, the hydrosilylation reaction proceeds rapidly, therefore, this is preferred.

The hydrosilylation reaction can be preferably performed in the presence of a catalyst, and for example, can be performed by a method of being brought into contact at from 10° C. to 300° C. for around one hour in a gas phase or a liquid phase, or the like.

For example, a platinum group catalyst can be used as a catalyst. For example, a ruthenium-based catalyst, a rhodium-based catalyst, a palladium-based catalyst, an osmium-based catalyst, an iridium-based catalyst, a platinum-based catalyst, or the like can be favorably used as the platinum group catalyst, and in particular, a palladium-based catalyst, and a platinum-based catalyst are favorably used. Examples of the palladium-based catalyst include, for example, palladium (II) chloride, ammonium tetraminochloropalladate (II), and palladium (II) oxide. Examples of the platinum-based catalyst include, for example, platinum (II) chloride, tetrachloroplatinic (II) acid, platinum (IV) chloride, hexachloroplatinic (IV) acid, ammonium hexachloroplatinate (IV), platinum (II) oxide, platinum (II) hydroxide, platinum (IV) dioxide, platinum (IV) oxide, platinum (IV) disulfide, platinum (IV) sulfide, and potassium hexachloroplatinate (IV). Further, an organic solvent phase can also be used which is obtained after tri-n-alkyl (having 1 to 8 carbon atoms) methyl ammonium chloride and tri-n-alkylamine are added to these palladium-based catalysts or platinum-based catalysts, and then ion-pair extraction is performed with a water/organic solvent system.

Further, as needed, an amine-based catalyst can also be used along with the above-described method, and electromagnetic waves such as UV rays, γ rays, or X-rays, plasma, or the like can also be used. In addition, the addition rate of the aliphatic unsaturated hydrocarbon to the Si—H groups can be determined from an absorption rate of infrared absorption spectra of the Si—H groups.

EXAMPLES

Hereinafter, Examples of the present invention will be specifically described with Comparative Examples. However, the present invention should not be limited to the following Examples.

Example 1

As nickel-based lithium-nickel composite oxide particles, 10 g of the composite oxide particles represented by the transition metal composition of $Li_{1.03}Ni_{0.82}Co_{0.15}Al_{0.03}$ was placed in a closed type thermostat, and left undisturbed at 40° C. for 8 hours under reduced pressure together with 1.0 g of 2,4,6,8-tetramethylcyclotetrasiloxane placed in another container. After that, the 2,4,6,8-tetramethylcyclotetrasiloxane was removed from the system, and vacuum drying was performed at 90° C. for 4 hour. When the mass after the drying was measured, the mass per gram of the lithium-nickel composite oxide particles was increased to 3 mg, therefore, it was confirmed that the resultant product was coated with 0.3% by mass of a siloxane compound.

Next, 50 g of the obtained processed powder was diluted with 300 g of isopropanol, and into which 50 g of allyl butyl ether[(1-(2-propenyloxy)butane)] and 0.07 g of hexachloroplatinic(IV) acid hexahydrate were added, the resultant mixture was reacted at 75° C. for 6 hours while being stirred. After that, the mixture was subjected to filtration, washed twice with isopropanol, and dried at 100° C. for 2 hours in a vacuum dryer to obtain processed powder. When the coated films were observed by a transmission electron microscope, as shown in FIG. 1, it was confirmed that the coated films with a thickness of around 5 nm were uniformly formed on all of the particle surfaces.

By using particles coated with this siloxane compound as the coated lithium-nickel composite oxide particles according to Example 1, the following stability test in air, gelation test, and battery' characteristics test (such as a charge and discharge test, and a cycle test) were performed.

Comparative Example 1

By using particles not coated with the siloxane compound as the lithium-nickel composite oxide particles according to Comparative Example 1, the following stability test in air, gelation test, and battery characteristics test (such as a charge and discharge test, and a cycle test) were performed.

<Stability Test in Air>

2.0 g of lithium-nickel composite oxide particles according to each of Example and Comparative Example was each put into a separate glass bottle, the glass bottles were left to stand in a thermostat at a temperature of 30° C. and humidity of 70% for one week, the increased mass was measured as compared to the initial mass, and the change rate per particles mass was calculated. By setting the change rate per particles mass of the lithium-nickel composite oxide particles after the lapse of one week according to Comparative Example 1 to 100, the change rate on every day of each of Example 1 and Comparative Example 1 was shown in FIG. 2.

Figure 2:
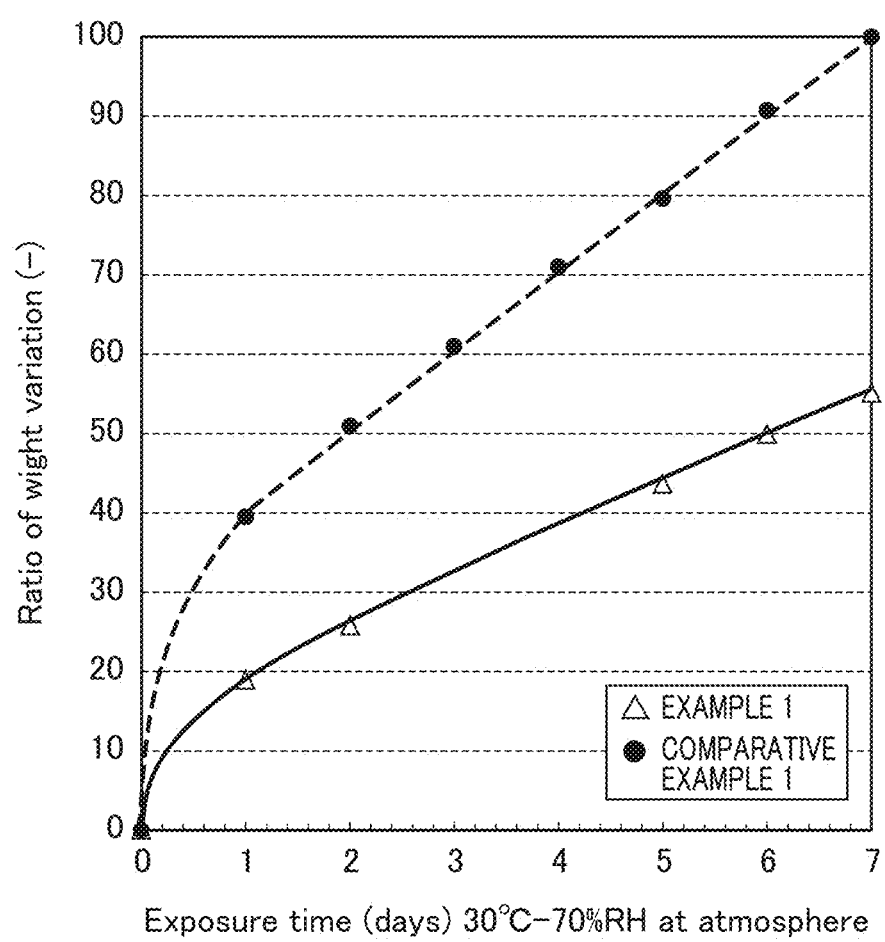
FIG. 2 shows change rate of the mass per particles mass in a case after standing for one week in Example 1 and Comparative Example 1.

As can be seen from FIG. 2, the coated lithium-nickel composite oxide particles in Example 1, which had been coated with a siloxane compound, had a small change rate per mass as compared to that of the lithium-nickel composite oxide particles in Comparative Example 1, which had not been coated with a siloxane compound. From this result, it was confirmed that by coating the particles with a siloxane compound, the permeation of moisture and carbon dioxide in the air can be suppressed.

<Gelation Test>

As to the measurement of change over time of the viscosity of the positive electrode mixture slurry, a positive electrode mixture slurry was prepared in the following order, and then the increase of viscosity and the gelation were observed.

As for the mixing ratio, lithium-nickel composite oxide particles according to Example 1 and Comparative Example 1, a conductive auxiliary, a binder, N-methyl-2-pyrrolidone (NMP) were weighed so that the mass ratio of the lithium-nickel composite oxide particles:the conductive auxiliary:the binder:the NMP was 45:2.5:2.5:50, further 1.5% by mass of water was added, then the resultant mixture was stirred by a rotation-revolution mixer, and a positive electrode mixture slurry was obtained. The obtained slurry was stored in an incubator at 25° C., and the changes over time of the viscosity increase and the degree of gelation in Example 1 and Comparative Example 1 were confirmed, respectively, by stir mixing the slurry with a spatula. The slurry was stored until obtaining complete gelation.

It took four days for the slurry according to Example 1 to reach the complete gelation, and it took one day for the slurry according to Comparative Example 1 to reach the complete gelation. From this, in the slurry according to Example 1, by coating the nickel-based lithium-nickel composite oxide particles with a siloxane compound, the generation of impurities such as lithium hydroxide (LiOH) and lithium carbonate ($Li_2CO_3$) was suppressed, and it was confirmed that the slurry gelation and the slurry viscosity increase caused by the reaction with impurities and a binder can be prevented.

Further, in a case when the lithium-nickel composite oxide particles were coated with a fluorine compound, the fluorine compound was dissolved generally into N-methyl-2-pyrrolidone (NMP), therefore, it is considered that even though being coated with the fluorine compound, the coated films are dissolved. Accordingly, different from the coated lithium-nickel composite oxide particles according to Example 1, it is considered to be difficult to suppress the generation of impurities when the produced positive electrode is stored. Therefore, the reaction with an electrolytic solution accompanied by gas generation in battery driving, which is caused by the impurities generated during the storage of the positive electrode, is difficult to be suppressed, and an expensive storage facility is required.

<Battery Characteristics Evaluation>

By the following procedures, a non-aqueous electrolyte secondary battery (lithium-ion secondary battery) for evaluation was prepared, and the battery characteristics evaluation was performed.

[Production of Secondary Battery]

Is for the battery characteristics evaluation of the lithium-nickel composite oxide particles obtained in the present invention, a coin type battery and a laminate type battery were prepared, and the coin type battery was subjected to a charge and discharge capacity measurement and the laminate cell type battery was subjected to a charge and discharge cycle test and a resistance measurement.

(a) Positive Electrode

Into the obtained lithium-nickel composite oxide particles according to Example 1 and Comparative Example 1, an acetylene black as a conductive auxiliary, and polyvinylidene fluoride (PVdF) as a binder were mixed so that the mass ratio of the particles, the acetylene black, and the PVdF was 85:10:5, and the resultant mixture was dissolved into an N-methyl-2-pyrrolidone (NMP) solution to prepare a positive electrode mixture slurry An aluminum foil was coated with the positive electrode mixture slurry by a comma coater and heated at 100° C. and dried, as a result of which a positive electrode was obtained. A load was applied to the obtained positive electrode through a roll press machine, and a positive electrode sheet in which the positive electrode density had been improved was prepared. This positive electrode sheet was punched out for the evaluation of the coin type battery so as to have the diameter of 9 mm, and also cut out for the evaluation of the laminated cell type battery so as to have the size of 50 mm×30 mm, and each of the punched-out sheet and the cut-out sheet was used as a positive electrode for evaluation.

(b) Negative Electrode

Graphite as a negative electrode active substance and polyvinylidene fluoride (PVdF) as a binder were mixed so that the mass ratio of the graphite and the PVdF was 92.5:7.5, and the resultant mixture was dissolved into an N-methyl-2-pyrrolidone (NMP) solution to obtain a negative electrode mixture paste.

In the same manner as in the positive electrode, with this negative electrode mixture slurry, a copper foil was coated by a comma coater, and heated at 120° C. and dried, as a result of which a negative electrode was obtained. A load was applied to the obtained negative electrode through a roll press machine, and a negative electrode sheet in which the electrode density had been increased was prepared. The obtained negative electrode sheet was punched out for the coin type battery so as to have the diameter of 14 mm, and also cut out for the laminated cell type battery so as to have the size of 54 mm×34 mm, and each of the punched-out sheet and the cut-out sheet was used as a negative electrode for evaluation.

(c) Coin Battery and Laminated Cell Type Battery

The prepared electrode for evaluation was dried at 120° C. for 12 hours in a vacuum dryer. By using this positive electrode, a 2032 type coin battery and a laminated cell type battery were prepared in a glove box in which the dew point was controlled at −80° C. in an argon atmosphere. For the electrolytic solution, ethylene carbonate (EC) using 1M of $LiPF_6$ as a supporting electrolyte and diethyl carbonate (DEC) (manufactured by TOMIYAMA PURE CHEMICAL INDUSTRIES, LTD.), the ratio of which was 3:7, were used, and a glass separator was used as a separator, to prepare each of the batteries for evaluation.

<<Charge and Discharge Test>>

The prepared coin type battery was left to stand for around 24 hours after the assembly, and charged at a current density of 0.2 C rate up to a cut--off voltage of 4.3 V in a thermostat at 25° C. after the open circuit voltage (OCV) was stabilized. After one hour of rest, a charge and discharge test for measuring the discharge capacity was performed when the battery was discharged up to a cut-off voltage of 3.0 V.

The initial discharge capacity of the coin type battery according to Example 1 was 191.82 mAh/g, but the initial discharge capacity of the coin type battery according to Comparative Example 1 was 191.93 mAh/g.

<<Cycle Test>>

In the same manner as in the coin type battery, the prepared laminate type battery was left to stand for around 24 hours after the assembly, and charged at a current density of 0.2 C rate up to a cut-off voltage of 4.1 V in a thermostat at 25° C. after the open circuit voltage was stabilized. After one hour of rest, the battery was discharged up to a cut-off voltage of 3.0 V. Next, this battery was subjected to a cycle test of repeating a cycle of 4.1 V-CC charge and 3.0 V-CC discharge at a current density of 2.0 C rate in a thermostat at 60° C., and a cycle test of confirming the capacity retention rate after 500 cycles was performed. The capacity change rate by the cycle test is shown in FIG. 3, the impedance test results before the cycle test are shown in FIG. 4, and the impedance test results after the cycle test of 500 cycles are shown in FIG. 5.

Figure 3:
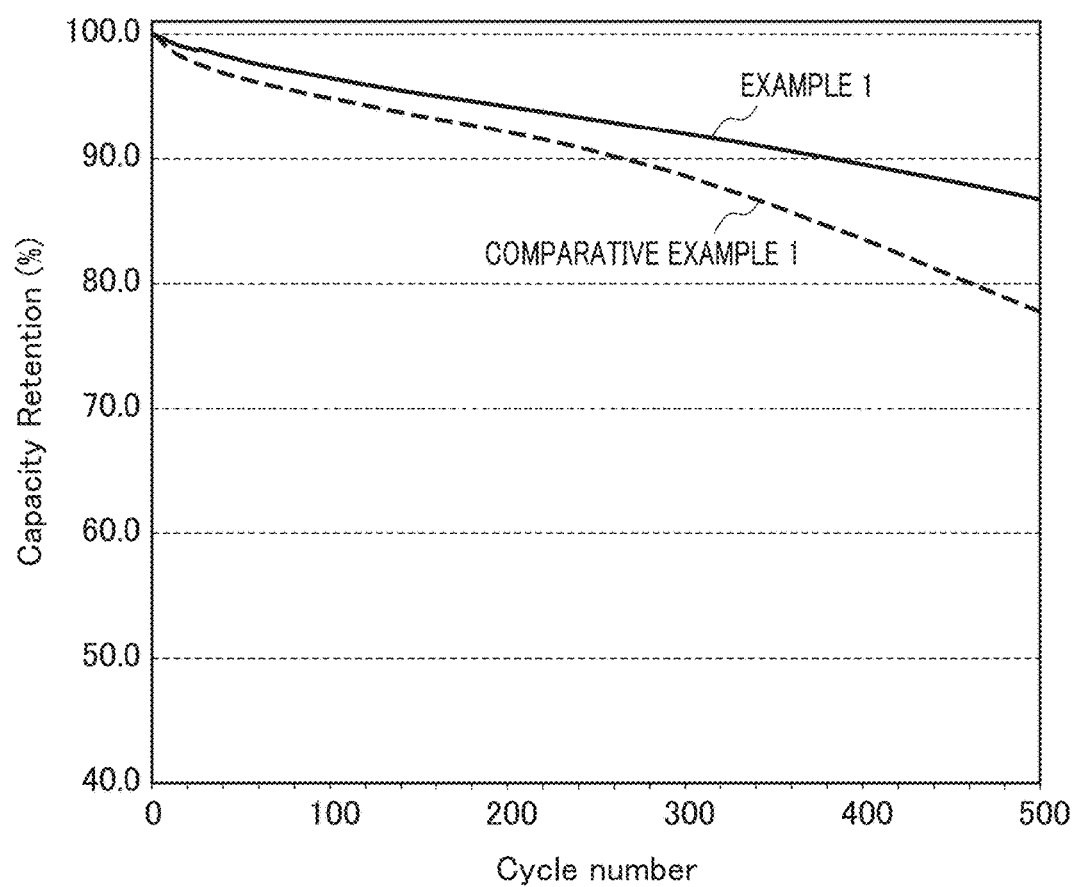
FIG. 3 shows a capacity change rate from a cycle test in Example 1 and Comparative Example 1.

From FIGS. 3 and 4, in the capacity retention before the cycle test and the Cole-Cole plot in impedance, the laminate batteries according to Example 1 and Comparative Example 1 were approximately equal to each other, but from FIGS. 3 and 5, in the capacity retention after the impedance test after a cycle test of 500 cycles, the capacity retention of the laminate type battery according to Example 1 was retained higher than that of the laminate type battery according to Comparative Example 1. From this, it can be understood that the lithium-nickel composite oxide particles used for the laminate battery of Example 1 is coated with a siloxane compound, therefore, the decreased amount of the capacity retention is smaller also when used in a long cycle. Accordingly, it was confirmed that the coated lithium-nickel composite oxide particles have higher capacity retention rate and are excellent.

The invention claimed is:

1. Coated lithium-nickel composite oxide particles, wherein surface coats are formed on surfaces of nickel-based lithium-nickel composite oxide particles and the surface coats are silicone compounds represented by the following Formula (3) obtained by ring-opening reaction, $$(R_1R_2SiO)_a[(R_1)(R_2)_2SiO_{1/2}]_b(R_1SiO_{3/2})_c \quad (3)$$

wherein $R_1$ represents a methyl group, $R_2$ at least partially includes an ether group and represents a functional group including one or more selected from the group consisting of at least an ether group and a hydrogen group, and a, b, and c represent a positive integer including zero.

2. The coated lithium-nickel composite oxide particles according to claim 1, wherein the $R_2$ in the above Formula (3) is an ether group of the following Formula (4), $$-C_nH_{2n}-O-C_mH_{2m+1} \quad (4)$$

wherein n, and m represent an integer of from 2 to 10, respectively.

3. The coated lithium-nickel composite oxide particles according to claim 1, wherein mass of the surface coats is from 0.1 to 1.0% by mass based on the lithium-nickel composite oxide particles.

4. The coated lithium-nickel composite oxide particles according to claim 1, wherein the coated lithium-nickel composite oxide particles are used as a positive-electrode active substance of a lithium-ion battery.

5. The coated lithium-nickel composite oxide particles according to claim 1, wherein the coated lithium-nickel composite oxide particles are spherical particles having an average particle diameter of from 5 to 20 μm.

6. The coated lithium-nickel composite oxide particles according to claim 1, wherein the surface coats are formed onto the entire surface of the nickel-based lithium-nickel composite oxide particles.

7. The coated lithium-nickel composite oxide particles according to claim 1, wherein the surface coats are directly cross-linked to the surfaces of the nickel-based lithium-nickel composite oxide particles.

8. A method for producing the lithium-nickel composite oxide particles of claim 1, comprising: forming surface coats by bringing a cyclic siloxane into contact with surfaces of nickel-based lithium-nickel composite oxide particles.

9. The method for producing coated lithium-nickel composite oxide particles according to claim 8, wherein the cyclic siloxane is 2,4,6,8-tetramethylcyclotetrasiloxane of the following Formula (1), and forms surface coats by gas-phase contact

(1)

10. The method for producing coated lithium-nickel composite oxide particles according to claim 9, wherein an environmental temperature at the time of the gas-phase contact is from 40° C. to 100° C.

11. The method for producing coated lithium-nickel composite oxide particles according to claim 9, wherein an organic ether compound or organic ester compound having an unsaturated bond at one end is added to a residual hydrogen atom after the gas-phase contact.

12. The method for producing coated lithium-nickel composite oxide particles according to claim 8, wherein, the lithium-nickel composite oxide is represented by the following Formula (2), $$Li_xNi_{(1-y-z)}M_yN_zO_2 \quad (2)$$

wherein x is a value of from 0.80 to 1.10, y is a value of from 0.01 to 0.20, z is a value of from 0.01 to 0.15, and 1-y-z is a value exceeding 0.65, and M represents at least one element selected from Co or Mn, and N represents at least one element selected from Al, In or Sn.

* * * * *